(12) United States Patent
Messana et al.

(10) Patent No.: US 10,822,444 B2
(45) Date of Patent: Nov. 3, 2020

(54) REACTIVE RESINS MADE FROM RENEWABLE SOURCES

(71) Applicant: Henkel IP & Holding GmbH, Duesseldorf (DE)

(72) Inventors: Andrew D. Messana, Newington, CT (US); David P. Dworak, Middletown, CT (US); Darel Gustafson, Shelton, CT (US); Anthony F. Jacobine, North Haverhill, NH (US)

(73) Assignee: Henkel IP & Holding GmbH, Dusseldorf (DE)

( * ) Notice: Subject to any disclaimer, the term of this patent is extended or adjusted under 35 U.S.C. 154(b) by 63 days.

(21) Appl. No.: 15/953,632

(22) Filed: Apr. 16, 2018

(65) Prior Publication Data

US 2018/0319920 A1 Nov. 8, 2018

Related U.S. Application Data

(63) Continuation of application No. PCT/US2016/057000, filed on Oct. 14, 2016.

(60) Provisional application No. 62/242,722, filed on Oct. 16, 2015.

(51) Int. Cl.

| | |
|---|---|
| *C08F 220/36* | (2006.01) |
| *C08G 18/75* | (2006.01) |
| *C09J 175/16* | (2006.01) |
| *C08G 18/71* | (2006.01) |
| *C08G 18/67* | (2006.01) |
| *C08G 18/32* | (2006.01) |
| *C08F 220/06* | (2006.01) |
| *C08G 18/36* | (2006.01) |
| *C08G 18/81* | (2006.01) |
| *C08L 75/16* | (2006.01) |
| *B32B 15/082* | (2006.01) |
| *C08K 5/00* | (2006.01) |
| *C08K 5/5415* | (2006.01) |
| *C08L 33/08* | (2006.01) |
| *C08L 33/10* | (2006.01) |
| *C08L 91/02* | (2006.01) |

(52) U.S. Cl.
CPC .......... *C08F 220/36* (2013.01); *B32B 15/082* (2013.01); *C08F 220/06* (2013.01); *C08G 18/3218* (2013.01); *C08G 18/36* (2013.01); *C08G 18/672* (2013.01); *C08G 18/718* (2013.01); *C08G 18/755* (2013.01); *C08G 18/8116* (2013.01); *C08K 5/0025* (2013.01); *C08K 5/5415* (2013.01); *C08L 33/08* (2013.01); *C08L 33/10* (2013.01); *C08L 75/16* (2013.01); *C08L 91/02* (2013.01); *C09J 175/16* (2013.01)

(58) Field of Classification Search
CPC ................................................. C08F 2220/343
See application file for complete search history.

(56) References Cited

U.S. PATENT DOCUMENTS

| | | |
|---|---|---|
| 5,605,999 A | 2/1997 | Chu et al. |
| 6,391,993 B1 | 5/2002 | Attarwala et al. |
| 6,835,762 B1 | 12/2004 | Klemarczyk et al. |
| 6,891,053 B2 | 5/2005 | Chasar et al. |
| 6,897,277 B1 | 5/2005 | Klemarczyk et al. |
| 6,958,368 B1 | 10/2005 | Klemarczyk et al. |
| 8,362,112 B2 | 1/2013 | Birkett et al. |
| 8,481,659 B2 | 7/2013 | Birkett et al. |
| 8,575,378 B2 | 11/2013 | Garrett et al. |
| 8,598,279 B2 | 12/2013 | Messana et al. |
| 8,757,294 B2 | 6/2014 | Johnson et al. |
| 2009/0278084 A1* | 11/2009 | Messana ............... C07C 229/60 252/182.17 |
| 2014/0200288 A1 | 7/2014 | Jin et al. |
| 2015/0232687 A1 | 8/2015 | Tian et al. |

FOREIGN PATENT DOCUMENTS

| | | | |
|---|---|---|---|
| CN | 101497684 | * | 8/2009 |
| EP | 2518095 | | 10/2012 |
| WO | 2012054547 | | 4/2012 |
| WO | 2013144033 | | 10/2013 |
| WO | 2015013064 | | 1/2014 |
| WO | 2014114957 | | 7/2014 |

OTHER PUBLICATIONS

Translation of CN 101497684 (2009) (Year: 2009).*
Ni, J. Therm. Anal. Calorim. (2010) 100:239-246 (Year: 2010).*
International Search Report issued in connection with International Patent Application No. PCT/US2016/057000 dated Jan. 26, 2017.

* cited by examiner

*Primary Examiner* — Robert C Boyle
(74) *Attorney, Agent, or Firm* — Steven C. Bauman

(57) ABSTRACT

The invention provides reactive resins compounds and compositions made from renewable materials, such as plant and animal oils. The reactive resins compounds and compositions may include an accelerator as part of their structure and are made from renewable materials containing a variety of functional groups. The compositions provide excellent adhesion and sealing capability.

19 Claims, 2 Drawing Sheets

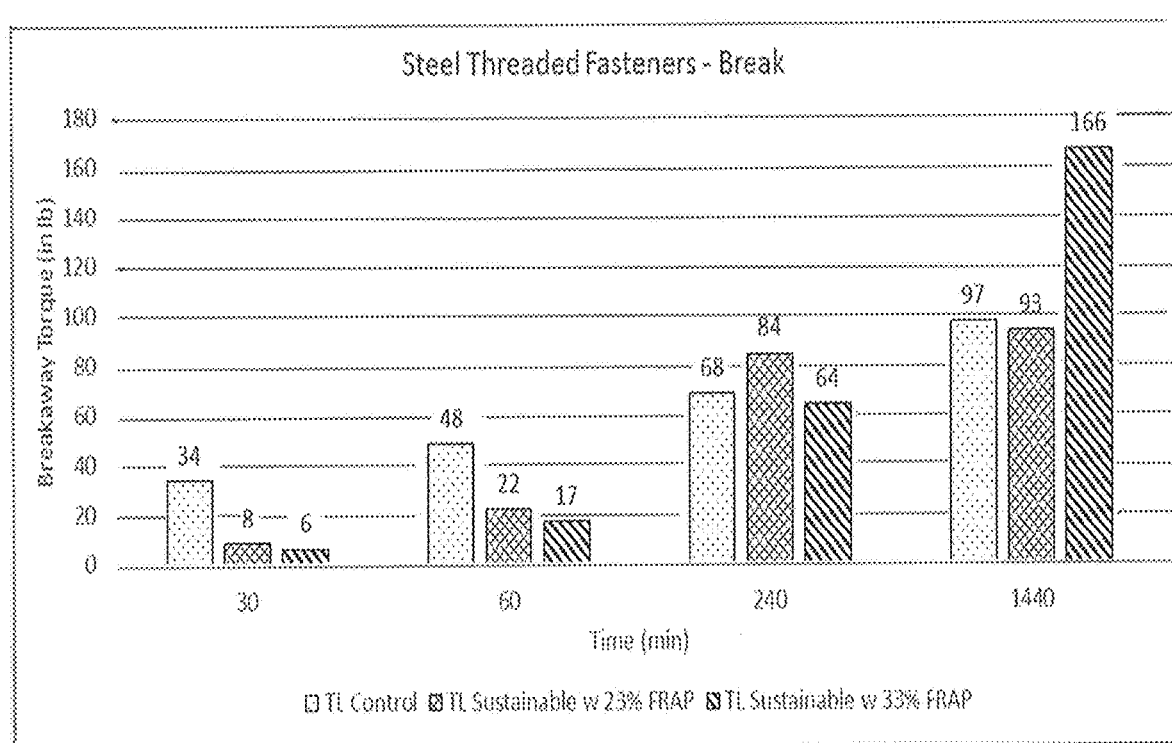

REACTIVE RESINS MADE FROM RENEWABLE SOURCES

BACKGROUND

Field

The invention relates generally to the preparation of reactive resins made from renewable materials and compositions made therefrom. More particularly, the invention relates to the preparation of reactive resin compounds made from functionalized plant and animal oils and curable compositions made therefrom.

BRIEF DESCRIPTION OF RELATED TECHNOLOGY

There is a current emphasis on renewable sources for materials, particularly as a means of replacing petroleum-based products. A number of reports have issued on modifying plant oils to include functional groups which are useful for further reactions and producing polymer materials. For example, U.S. Pat. No. 6,891,053 discloses a method of making oleochemical oil-based polyols by mixing an epoxidized oleochemical, such as a vegetable or animal fat, and an alcohol using an activated or acid leached-clay to form the oleo-chemical oil-based polyol. U.S. Pat. Nos. 8,757,294 and 8,575,378 disclose other methods of making modified plant-based polyols by using a plant oil which includes at least one O=O group and reacting that group with a nucleophilic functional group and an active hydrogen group. The resulting modified plant oils have hydroxyl functionalization useful for further reaction, such as the reaction with an isocyanate compound to form a polyurethane.

Recently, modified plant oils having hydroxyl functionality have become commercially available. For example, several soy-based polyols sold under the brand Agrol by Biobased Technologies, Springdale, Ariz., are disclosed as being useful sources of renewable polyols which may be used for making polyurethanes.

It would be advantageous if there was a process which uses renewable materials such as plant and animal oils to form reactive polymer resins which may contain (meth) acrylate, alkoxy, and other functionalities, as well as compositions based thereon.

SUMMARY

The present invention provides novel compounds, compositions and methods using biorenewable oleaginous starting materials. The compounds may function as reactive polymer resins and be used to formulate a variety of adhesive, sealing and coating compositions may be formed therefrom.

In one aspect of the invention there is provided a reactive resin having the Structure I:

$$B\text{-}(Q)_{2\text{-}10}$$

where:
a) B is selected from an oleaginous polymer unit derived from a plant or animal source;
b) Q is $[(U\text{-}L\text{-}U\text{-}A)_y\text{-}U\text{-}L\text{-}]_x\text{-}U\text{-}F$;
c) U is selected from a urethane linkage, a urea linkage and a thiourea linkage and may be the same or different in each occurrence;
d) L is a residue unit of a diisocyanate, said residue unit having a molar mass of from about 60 to about 500 g/mol;
e) A is an accelerator residue unit;
f) F is a (meth)acrylate-containing group or an alkoxy silane group;
g) x is 0-100; and
h) y is 0-10.

Desirably, but not necessarily, when y is 0 then x is not 0. The isocyanate residue in Structure I referred to herein may be a saturated or unsaturated hydrocarbon which may be substituted or unsubstituted, and may be interrupted with one or more O, S or N atoms.

In another aspect of the invention there is provided a reactive resin formed from the reaction of
a) an oleaginous polymer derived from a plant or animal source which has a functionality containing one or more pendent OH, $NH_2$ and SH groups;
b) a diisocyanate in an amount sufficient to leave remaining pendent active NCO groups connected through a linkage to the oleaginous polymer, said linkage selected from a urethane linkage, a urea linkage and a thiourea linkage;
c) an accelerator having one or more reactive groups which react in the presence of NCO; and
d) a (meth)acylate-containing or alkoxysilane-containing component which further contains a functional group reactive with at least one of an NCO group, an OH group, an $NH_2$ group and a SH group.

In another aspect of the invention there is provided a reactive resin formed from the reaction of:
a) an oleaginous polymer derived from a plant or animal source which has a functionality containing one or more pendent OH, NCO, $NH_2$ and/or SH groups;
b) an accelerator having one or more functional groups reactive in the presence of NCO; and
c) a (meth)acrylate-containing or alkoxysilane-containing isocyanate.

In another aspect of the invention there is provided a reactive resin formed from the reaction product of:
a) a plant oil or animal fat, said oil or fat being functionalized with one or more of an OH group, an $NH_2$ group and a SH group; and
b) a (meth)acrylate containing at least one of an OH group and an NCO group.

In another aspect of the invention there is provided a reactive resin formed by the reaction product of:
a) a plant oil or an animal fat, said oil or fat being functionalized with one or more of an OH group, an $NH_2$ group and a SH group; and
b) an isocyanate-terminated(meth)acrylate or isocyanate-terminated alkoxysilane.

In another aspect of the invention there is provided a reactive resin formed from the reaction product of:
a) an hydoxylated plant oil or hydroxylated fatty acid from an animal containing a reactive isocyanate group; and
b) one or more of an alkoxyaminosilane and a hydroxylated methacrylate.

In another aspect of the invention there is provided an anaerobic composition comprising:
a) at least one (meth)acrylate component;
b) an anaerobic cure system; and
c) a reactive resin represented by the structure:

$$B\text{-}(Q)_{2\text{-}10} \quad \text{Structure I}$$

where:
i) B is selected from an oleaginous polymer unit derived from a plant or animal source;
ii) Q is $[(U-L-U-A)_y-U-L-]_x-U-F$;
iii) U is selected from a urethane linkage, a urea linkage and a thiourea linkage and may be the same or different in each occurrence;
iv) L is a residue unit of a diisocyanate which may be a saturated or unsaturated hydrocarbon and which may be substituted or unsubstituted, and may be interrupted with one or more O, S or N, said residue unit having a molar mass of from about 60 to about 500 g/mol;
v) A is an accelerator residue unit;
vi) F is a (meth)acrylate-containing group or an alkoxy silane group;
vii) x is 0-100; and
viii) y is 0-10, and desirably when y is 0, then x is not 0.

In another aspect of the invention there is provided a method of preparing curable composition which includes:
a) reacting a bio-renewable oleaginous plant or animal oil component, said component being functionalized with one or more groups selected form OH, NH$_2$, NCO and SH, with an accelerator having dihydroxy or diamine functionality, and a diisocyanate to form a reactive polymer; and
b) reacting said reaction polymer with a (meth)acrylate-containing or alkoxyaminosilane component.

In still a further aspect of the invention there is provided an anaerobic composition which includes:
a) at least one (meth)acrylate component present in an amount of about 10 wt % to about 90 wt % of the total composition;
b) an anaerobic cure system present in an amount of about 0.1 wt % to about 5.0 wt % of the total composition; and
c) a reactive resin present in an amount of about 1.0 wt % to about 60 wt % of the total composition, which includes a (meth)acrylate-functionalized bio-renewable oleaginous polymer containing an accelerator segment linked to said polymer through a urethane, urea or thiourea linkage.

In still a further aspect of the invention there is provided a method of bonding surfaces, which includes the steps of:
1) providing an adhesive composition which includes;
  a) at least one (meth)acrylate component;
  b) a cure system present in an amount of about 0.1 wt % to about 5 wt % of the total composition; and
  c) a reactive polymer represented by the structure

$B-(Q)_{2-10}$ where said reactive polymer is preset in amounts of about 1.0 wt % to about 60 wt % of the total composition and:
i) B is selected from an oleaginous polymer unit derived from a plant or animal source;
ii) Q is $[(U-L-U-A)_y-U-L-]_x-U-F$;
iii) U is selected from a urethane linkage, a urea linkage and a thiourea linkage and may be the same or different in each occurrence;
iv) L is a residue unit of a diisocyanate which may be a saturated or unsaturated hydrocarbon and which may be substituted or unsubstituted, and may be interrupted with one or more 0, S or N, said residue unit having a molar mass of from about 60 to about 500 g/mol;
v) A is an accelerator residue unit;
vi) F is a (meth)acrylate-containing group or an alkoxy silane group;
vii) x is 0400; and
viii) y is 0-10, and desirably when y is 0, then x is not 0;
2) applying said composition to a surface of a substrate;
3) mating said substrate with another substrate; and
4) permitting said composition to cure.

In yet another aspect of the invention there is provided a method of preparing curable compositions which includes:
a) reacting a plant oil or animal fat, said animal fat including tallow, said plant oil or animal fat being functionalized with one or more of an hydroxyl group, an NH$_2$ group and an SH group; and
b) further reacting the product of a) with an isocyanate-terminated(meth)acrylate or isocyanate-terminated alkoxysilane.

In another aspect, this invention discloses a method of preparing an adhesive composition said method comprising:
(a) forming a composition comprising:
  (i) at least one (meth)acrylate component in the amount of about 50 wt % to about 90 wt % of the total composition; and
  (ii) an anaerobic cure system in the amount of about 0.1 wt % to about 5.0 wt % of the total composition; and
(b) combining said composition with a (meth)acrylate-functionalized or alkoxy-silane functionalized soybean oil component, in an amount of 1.0 wt % to about 60.0 wt %.

In yet another aspect, this invention discloses a method of bonding an oily surface comprising the steps of:
(a) providing an anaerobic adhesive composition comprising;
  (i) at least one (meth)acrylate component in the amount of about 50 wt % to about 90 wt % of the total composition;
  (ii) an anaerobic cure system in the amount of about 0.1 wt % to about 5.0 wt % of the total composition; and
  (iii) a (meth)acrylate-functionalized bio-renewable oleaginous polyurethane polymer, such as a (meth)acrylate-functionalized soybean oil component, in an amount of about 1.0 wt % to about 60.0 wt % of the total composition;
(b) applying the composition to an oily surface of a substrate;
(c) mating the substrate with another substrate; and
(d) permitting the composition to cure.

BRIEF DESCRIPTION OF THE FIGURES

FIG. 2 depicts a plot of thread-locking breakaway strength measured in in-lbs (torque) measured over time (minutes) for anaerobically curable compositions having a (meth)acylate-functionalized Agrol-branded biorenewable component. This plot shows a comparison of an anaerobic composition having free accelerator and an anaerobic composition having bound accelerator (the accelerator is incorporated into the reactive resin chemical structure). TL Control is inventive Composition C with free accelerator. TL Sustainable w 23% FRAP is Composition D with built-in accelerator. TL Sustainable w 33% FRAP is Composition E with built-in accelerator.

DETAILED DESCRIPTION

Figure 1:
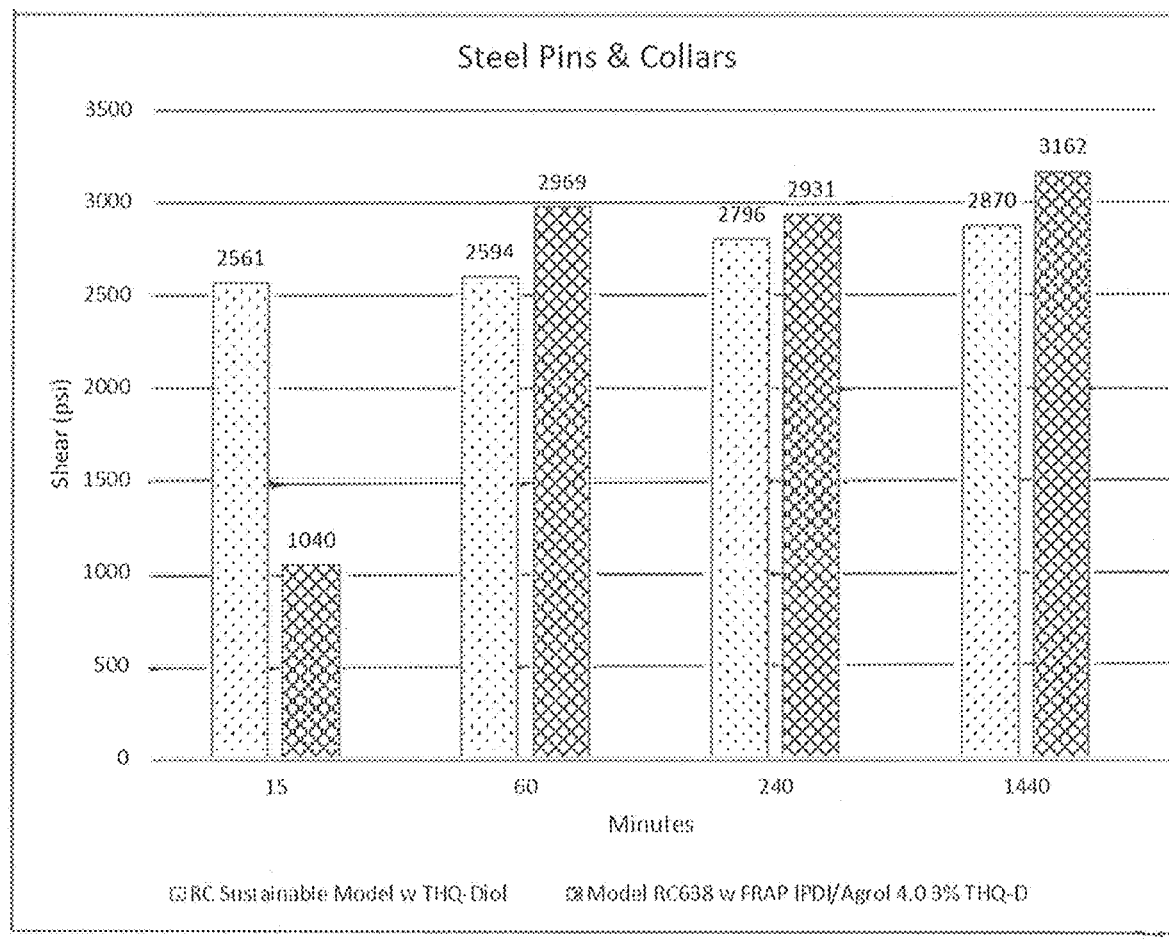
FIG. 1 depicts a plot of shear strength measured in psi measured over time (minutes) for anaerobically curable compositions having a (meth)acrylate-functionalized Agrol-branded biorenewable component. This plot shows an anaerobic composition having a free accelerator additive compared to an anaerobic composition having a bound accelerator (the accelerator is incorporated into the reactive resin chemical structure). RC Sustainable Model w THQ-Diol is Composition A. Model RC638 w FRAP IPDA/Agrol 4.0 3% THQ-D is Composition B.

The present invention provides new processes and curable polymers/compositions using bio-based functionalized materials, such as plant and animal oils. Plant oils generally require modification to include functional groups, such as hydroxyl groups in their chemical structure, and such products are currently commercially available. The present invention includes the use of plant and animal oils (oleaginous materials) which include, either naturally or through modification, one or more reactive functional groups selected from hydroxyl groups, amino groups, isocyanate groups, alkoxy groups ($C_{1-4}$) and/or thiol groups. Such reactive groups incorporated on the bio-based material allow for further reaction to make the reactive compounds and compositions of the present invention. A number of different routes may be used to create the final reactive compounds and compositions of the present invention, each of which depends upon the selection of starting materials, i.e., the selected plant or animal oleaginous material containing one or more of the aforementioned reactive functional groups, as well as the selection of additional reactants, including such components as diisocyanates, accelerators, methacrylates, and alkoxy-silane groups, which when reacted form the renewable compounds and compositions of the present invention. In one method, termed the direct method, the oleaginous plant or animal material (the residue of which is represented by "B" in Structure I), having one or more reactive functional groups selected from hydroxyl, amino and thiol, is reacted with a (meth)acrylate-containing or alkoxy-containing isocyanate compounds (represented by "F" in Structure I) to form curable polymers.

The invention also provides for the ability to incorporate accelerators in two different ways into the compositions made therefrom, as a free component and as a component incorporated into the reactive resin structure. Conventional anaerobic compositions generally incorporate free accelerator components, usually of low molecular weight. These accelerator components often have less than favorable safety and environmental profiles. Thus in some embodiments of the invention, there is provided a methods, reactive resins and compositions made therefrom, which have the accelerator component incorporated into (bound to) the reactive resin chemical structure, as shown herein. Doing so provides the advantage of avoiding the toxicology and safety issues of using the free accelerator components.

A variety of renewable functionalized plant oils, such as hydroxylated plant oils (also known as bio-based polyols) may be used in the present invention. For example, oils such as soybean oil, alkyl ester ($C_{1-4}$) of soybean, almond oil, canola oil, alkyl ester ($C_{1-4}$) of canola oil, coconut oil, cod liver oil, corn oil, cottonseed oil, flaxseed oil, linseed oil, olive oil, palm oil, peanut oil, safflower oil, sesame oil, sunflower oil, walnut oil, castor oil and combinations thereof, may be used. In addition to hydroxylation, the plant oils may contain and/or be modified to contain alkoxy ($C_{1-4}$), $NH_2$ and SH functional groups. The functional groups on the plant oils allow for reaction with other reactants to build the reactive resins of the invention.

Among the desirable renewable hydroxylated plant oils are those commercially under the trade name Agrol, sold by Biobased Technologies, Springfield, Ark., as further described herein. The Agrol-brand polyols are reported to be hydroxylated soybean oils, which are derived for natural soybean. The degree of hydroxylation may vary and hydroxyl values from 70 to 200 mg KOH/g may be employed. Some of those products are Agrol 2.0-5.6 (described as soy-based polyols or hydroxylated soybean oil containing 97% or more bio-based content derived from purified soybean oil). The hydroxyl values (mg KOH/g) vary from 65-74 (for Agrol 2.0), 107-117 (for Agrol 3.6), 125-137 (for Agrol 4.3) and 151-170 (for Agrol 5.6).

The viscosity of these soybean-derived polyols may vary from about 200 to about 3,000 at 25° C. and hydroxyl functionality can range from 1.7 to 7.0 eq/mol.

And still other examples include Oxi-Cure 2000 from Cargill, Incorporated, Minneapolis, Minn., which is comprised of vegetable-based esters that are highly reactive and have relatively low viscosity, and Myrifilm from Myrian Corporation, Quincy, Mass., which is a bio-based, ultra-low odor, broad spectrum coalescing solvent.

Among the animal oils useful for preparing the compounds of the invention are those oils containing fatty acids, such as tallow, which includes one or more fatty acids. The fatty acids, such as those derived from tallow, may contain and/or be modified to contain one or more OH, $NH_2$ and SH groups.

As mentioned above, the functionalized bio-renewable oleaginous polymers prepared in accordance with the invention may be prepared by using either a direct method (previously described) or an extended method.

In the extended method the oleaginous plant or animal material (the residue of which is represented by "B" in Structure I) containing one or more of the aforementioned reactive functional groups, i.e., OH, $NH_2$ and SH, is reacted with a diisocyanate hydrocarbon unit (represented by "L" in Structure I) and then further reacted with an accelerator component (the residue of which is represented by "A" in Structure I), and still further reacted with (meth)acrylate-containing or alkoxy-containing compounds, which compounds have one or more OH and NCO functionalities present (represented by "F" in Structure I), to form curable polymers.

Desirably the equivalents ratio of OH:NCO in the reactants is about 0.1 to 3.0, such as about 0.4 to about 2.0, and desirably about 0.8 to about 1.0 equivalents of OH:NCO.

The reaction is conducted in a reactor with or without solvent. When a solvent is used, suitable ones include polar, aprotic ones like toluene, THF, ethyl acetate, xylenes, and the like. The reaction is conducted at temperatures of about 25° C. to about 100° C., such as about 40° C. to about 80° C., desirably about 60° C. to about 75° C.

In the extended method, the bio-renewable oleaginous material (represented by B in Structure I) may be derived from plant oil or animal oil, which oleaginous material contains one or more functional groups selected from OH, $NH_2$ and SH. The oleaginous material is reacted with a diisocyanate (the residue of which is represented by L in Structure I) to form an intermediate containing one or more urethane, urea or thiourea linkages, or a combination of such linkages. Thus, such intermediates may be represented by a B-U-L unit in Structure I. The stoichiometry of the reactants is controlled such that the intermediate contains unreacted pendent NCO groups, intended to be used for further reaction. That is, pendent NCO groups remain on the intermediate for further reaction with, for example, an hydroxyl-containing (meth)acrylate component, a polyfunctional alcohol component, or an alkoxy-containing amine component.

The equivalents ratio of functional group (e.g., OH, NH$_2$, or SH) on the oleaginous plant or animal material to NCO in the reactants used to form the aforementioned intermediates is about 0.1 to about 10.0, such as about 0.2 to about 3.0, desirably about 0.5 to about 2.0 equivalents of oleaginous functional group (e.g., OH, NH$_2$ and SH) to NCO.

The reaction is conducted in a reactor with or without solvent. When a solvent is used, suitable ones include polar, aprotic ones like toluene, THF, ethyl acetate, xylenes, and the like. The reaction is conducted at temperatures of about 25° C. to about 100° C., such as about 40° C. to about 80° C., desirably about 60° C. to about 75° C.

Metal-based catalysts may be used in preparation of the reactive resin polymers, such as dibutyltin dilaurate (among others) may be used in amounts of about 0.01 wt % to about 5 wt %, such as about 0.5 wt % to about 2 wt %, desirably about 0.1 wt % to about 1.0 wt %, based on the total reaction mixture. The reaction should be carried out for as long as required to substantially fully react the hydroxyl, amine and/or thiol groups. Reaction times may range from about 2 to about 24 hours, such as about 3 to about 12 hours, desirably about 4 to about 8 hours.

Here, the aforementioned intermediate polymers contains pendent NCO groups which are available for further reaction with additional components, such as accelerator components and terminal group components such as (meth)acrylate-containing or alkoxy-silane-containing components.

For example, the intermediate polymers may be further reacted, if desired, with one or more component(s) containing hydroxyl groups, alkoxy groups, thiol or amine groups. For example, an intermediate polyurethane polymer may be reacted with an aminosilane compound which includes alkoxy functionality for moisture curing.

One particularly desirable further reaction includes the reaction of an intermediate polyurethane with an hydroxyl-containing (meth)acrylate component [e.g., 2-hydroxyethyl (meth)acrylate ("HEMA")], to yield curable (meth)acrylate-functionalized polyurethane polymers. Desirably the equivalents ratio of NCO:OH in the reaction of the intermediate polyurethane with the hydroxyl-containing (meth) acrylate component is about 1:0.01 to about 1:1.2. This reaction yields a curable (meth)acrylate-functionalized polyurethane polymer useful for a variety of applications as previously mentioned. The reaction of the intermediate polyurethane with the hydroxyl-containing (meth)acrylate component is carried out for as long as required to fully react the isocyanate and hydroxyl groups. This principle also applies to the amine and SH groups which may be present on the oleaginous material.

The amount of renewable content present in the intermediate and final polymers made in accordance with the present invention may range from about 30 wt % to about 70 wt %, more desirably about 45 wt % to about 60 wt %. Due to the selection of the specific functionalized oleaginous material, the end products formed may contain a hard (relatively rigid) segment (i.e., attributed to the reaction of the diisocyante with short chain diols present in the hydroxylated oleaginous materials) of about 1 wt % to about 10 wt % and desirably about 2 wt % to about 5 wt %.

The resultant reactive resin end products may have anaerobic, UV or moisture curing capability, or a combination of such curing capabilities.

The oleaginous polymer material used to form the polymer residue unit is represented in Structure I by "B". The oleaginous polymer starting material includes one or more reactive functional groups selected from OH, NH$_2$ and SH for further reaction with the other reactants used to build the reactive end products represented by Structure I. Combinations of functional groups may be present on the oleaginous polymer.

These oleaginous plant and animal materials may naturally contain and/or may be modified to contain one or more of the aforementioned reactive functional groups. Combinations of these oleaginous materials may be used.

L is a residue unit of an isocyanate which may be a saturated or unsaturated hydrocarbon and which may be substituted or unsubstituted, and may be interrupted with one or more O, S or N, and the residue unit may have a molar mass of from about 60 to about 500 g/mol. Non-limiting examples of useful hydrocarbon units include without limitation linear, branched and cyclic diisocyanates, including aliphatic and aromatic diisocyanate compounds. As a starting material. L may contain at least one NCO group, and desirably at least two isocyante isocyanate groups. In addition to NCO, L may also contain one or more OH groups.

Diisocyanates useful in the present invention include, without limitation, isophorone diisocyanate ("IPDI"), IPDI isocyanaurate, polymeric IPDI, naphthalene 1,5-diisocyanate ("NDI"), methylene bis-cyclohexylisocyanate, methylene diphenyl diisocyanate ("MDI"), polymeric MDI, toluene diisocyanate ("TDI"), isocyanaurate of TDI, TDI-trimethylolpropane adduct, polymeric TDI, hexamethylene diisocyanate ("HDI"), HDI isocyanaurate, HDI biurate, polymeric HDI, xylylene diisocyanate, hydrogenated xylylene diisocyanate, tetramethyl xylylene diisocyanate, p-phenylene diisocyanate, 3,3'-dimethyldiphenyl-4,4'-diisocyanate ("DDDI"), 2,2,4-trimethylhexamethylene diisocyanate ("TMDI"), norbornane diisocyanate ("NDI"), and 4,4'-dibenzyl diisocyanate ("DBDI"). Combinations of diisocyanates may also be used.

Monoisocyanates may also be used in the present invention. Non-limiting examples include 2-isocyanatoethyl methacrylate, 2-isocyantoethyl acrylate and 3-isopropenyl-α,α-dimethylbenzyl isocyanate.

Among the (meth)acrylate materials ("(meth)" is intended to include both methacrylates and acrylates) useful in the preparation of compounds of the invention include (represented by F in Structure I), without limitation, 2-isocyanatoethyl methacrylate, 2-isocyantoethyl acrylate, 3-isopropenyl-α,α-dimethylbenzyl isocyanate, 2-hydroxyethyl methacrylate, 2-hydroxyethyl acrylate, isomers of hydroxybutyl acrylate, isomers of hydroxybutyl methacrylate, isomers of hydroxypropyl acrylate, poly(propylene glycol) (meth)acrylate, poly(ethylene glycol) (meth)acrylate, and 2-hydroxy-3-pheoxypropyl acrylate.

Among the silane materials useful in the invention include 3-isocyanatopropyltriethoxysilane, 3-isocyanatopropylmethyldiethoxysilane, 3-isocyanatopropyldimethylethoxysilane, 3-isocyanatopropyltrimethoxysilane, 3-isocyanatopropylmethyldimethoxysilane, 3-isocyanatopropyldimethylmethoxysilane, 4-aminobutyltriethoxysilane, 4-aminobutylmethyldiethoxysilane, 4-aminobutyldimethylethoxysilane, 4-aminobutyltrimethoxysilane, 4-aminobutylmethyldimethoxysilane, 4-aminobutyldimethylmethoxysilane, 4-amino-3,3-dimethylbutylmethyldimethoxysilane, dimethylbutyltrimethoxysilane, 1-amino-2-(dimethylethoxysilyl)propane, 3-(m-aminophenoxy)propyltrimethoxysilane, m-aminophenyltrimethoxysilane, m-aminophenyltriethoxysilane, 3-aminopropyltriethoxysilane, 3-aminopropylmethyldiethoxysilane, 3-aminopropyldimethyethoxysilane, 3-aminopropyltrimethoxysilane, 3-aminopropylmethyldimethoxysilane, 3-aminopropyldimethymethoxysilane, 3-aminopropylmethylbis(trimethylsiloxy)silane, 3-aminopropylpentamethyldisiloxane, 11-aminoundecyltriethoxysilane, and 11-aminoundecyltrimethoxysilane. Combinations of silanes may also be employed.

The accelerator component useful in making the reactive resin compounds and compositions of the present invention includes, without limitation a variety of accelerators having one or more reactive groups which react in the presence of active NCO groups. The residue of the accelerator component is represented by "A" in Structure I. The accelerator component includes at least one O, N or S which reacts to form one of a urethane linkage, an urea linkage and a thiourea linkage, the linkage being represented by "U" in Structure 1. Thus, although each occurrence of U may be the same type of linkage, for example, a polyurethane linkage for a particular resin compound, it is also contemplated that one occurrence of U may be a urethane linkage and another occurrence of U may be a urea or thiourea linkage within the same compound of Structure I.

For example, accelerators useful in preparing the inventive compounds include 1,2,3,4-tetra-hydroquinone ("THQ"), acetyl-phenyl hydrazine ("APH"), di-alkyl toluidines (such as N,N-diethyl-p-toluidine ("DE-p-T") and N,N-dimethyl-o-toluidine ("DM-o-T")) and combinations thereof.

Additional accelerators include those represented by the following structures:

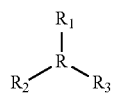

Structure III where here $R_1$ is a substituted or substituted hydrocarbon unit which may be aliphatic or aromatic and includes, without limitation alkyl, alkylene, aryl, arylene; $R_2$ and $R_3$ provide (di)hydroxyl-functionality either alone or in combination: R may be N or, if $R_1$ contains phenylhydrazine functionality, then R may also be O. For example, additional useful structures may be represented by the following:

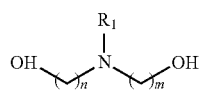

Structure IV where here n and m is 1 to 12, or

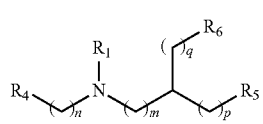

Structure V where here $R_4$ may be aliphatic (i.e., alkyl) or aromatic, or $R_4$ may be part of a ring system that incorporates $R_1$; $R_1$ may be defined as in Structure IV above; $R_5$ and $R_6$ may each independently be OH or $NH_2$; and p and q may each independently be from 0-12.

Further useful accelerators include:

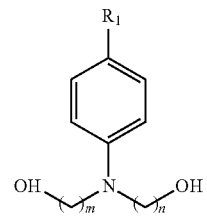

Structure VI where here $R_1$ may be defined as in Structure IV above. Further non-limiting examples of specific useful accelerators include:

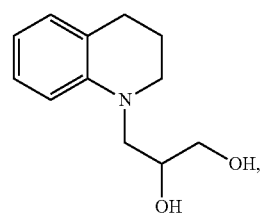

Structure VII

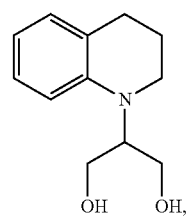

Structure VIII

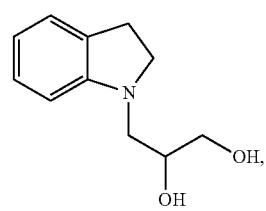

Structure IX

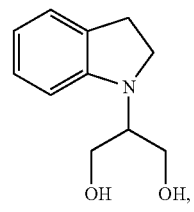

Structure X

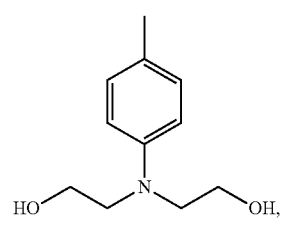

Structure XI

Structure XII

[chemical structure]

Structure XIII

[chemical structure]

Structure XIV

[chemical structure]

Other accelerators useful in preparing the inventive compounds include those set forth in U.S. Pat. No. 8,362,112 ("'112 Patent"), U.S. Pat. No. 8,481,659 ("'659 Patent") and U.S. Pat. No. 8,598,279 ("'279 Patent"), each of which are assigned to Henkel Corporation, and each of which are incorporated by reference herein in their entirety.

Examples of useful accelerators from the '112 Patent include

Structure XV

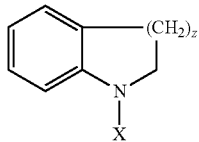

where here X is $C_{1-20}$ alkyl, $C_{2-20}$ alkenyl, or $C_{7-20}$ alkaryl, any of which may be interrupted by one or more hereto atoms, and which are functionalized by at least one and preferably at least two groups selected from —OH, —NH$_2$ and —SH and z is 1-3.

Examples of useful accelerators from the '279 Patent include adducts of a heteroatom-containing compound and copolymers of a latent carboxylic acid and one or more of styrene and substituted derivatives thereof, vinyl ether, polyalkyene, (meth)acrylate ester and combinations thereof, which may optionally be terminated with cumene. The adduct of a heteroatom-containing compound and a copolymer ("P") of a latent carboxylic acid and one or more of styrene and substituted derivatives thereof, vinyl ether, polyalkyene, (meth)acrylate ester and combinations thereof, includes a number of variables. For instance, the copolymer P may be terminated with cumene. In addition, the styrene and substituted derivatives thereof, vinyl ether, polyalkyene, (meth)acrylate ester and combinations thereof, may be a substituted derivative thereof, for instance substituted by one or more of halogen, alkyl, alkenyl, hydroxyl alkyl, hydroxyl alkenyl, or carboxyl. And of course the heteroatom itself and the heteroatom-containing compound may differ.

The heteroatom-containing compound that is reactive with the latent carboxylic acid [such as maleic acid anhydride or (meth)acryloyl halide] accelerates the rate of anaerobic cure in anaerobically curable compositions.

The heteroatom-containing compound reactive with the latent carboxylic acid [such as maleic acid anhydride or (meth)acryloyl halide] may be selected from nitrogen-containing compounds, such as amines or arylhydrazines, amino-substituted toluidines, hydroxyl-substituted toluidines or mercapto-substituted toluidines, and combinations thereof, where the toluidine may be o-, m-, or p-substituted.

The copolymer P should have a molecular weight of at least 1,000 dalton, but less than 15,000 dalton.

The copolymer P may be embraced by the nominal structure:

$$(D)_o-(J)_x-(G)_y-(C)_z-(D)_{o'} \quad \text{Structure XVI}$$

where J is a residue selected from styrene or substituted styrene, an acrylate ester, a vinyl ether and a polypropylene; G is a residue of an adduct formed from a latent carboxylic acid (such as maleic acid anhydride or (meth)acryloyl halide) and a heteroatom-containing compound; C is an optional residue as defined by J, and D is a cumene residue; x+y+z=100%−(o+o'), and o and o'=0 or 1, representing the presence or absence of a cumene residue unit. For instance, x is between 1 and 99 mole %, such as between 49 and 85 mole %, and y is between 1 and 99 mole %, such as between 15 and 51 mole %. The value of x to the value of y may be from two times to ninety-nine times or x and y may have about the same value. The value of y to the value of x may be from two to ninety-nine times or y and x may have about the same value. The value of optional residue C where z is between 1 and 99 mole %, such as between 49 and 85 mole %, and y is between 1 and 99 mole %, such as between 15 and 51 mole %. The value of z to the value of y may be from two times to ninety-nine times or z and y may have about the same value. The value of y to the value of z may be from two to ninety-nine times or y and z may have about the same value. In addition, and more specifically, an anhydride functional copolymer, such as poly(styrene-co-maleic anhydride), may be used that is rich in anhydride, such as maleic anhydride.

The copolymer of Structure XVI may be a random copolymer, a block copolymer or a graft copolymer.

The compounds of the invention are desirably terminated with a meth)acrylate-containing group or an alkoxy-silane group, the residue of which is represented by "F" in Structure I. F may be a residue of a component selected from 2-isocyanatoethyl methacrylate, 2-isocyantoethyl acrylate, 3-isopropenyl-α,α-dimethylbenzyl isocyanate, 2-hydroxyethyl methacrylate, 2-hydroxyethyl acrylate, isomers of hydroxybutyl acrylate, isomers of hydroxybutyl methacrylate, isomers of hydroxypropyl acrylate, poly(propylene glycol) (meth)acrylate, poly(ethylene glycol) (meth)acrylate, and 2-hydroxy-3-pheoxypropyl acrylate. F may also be a residue of a component selected from 3-isocyanatopropyltriethoxysilane, 3-isocyanatopropylmethyldiethoxysilane, 3-isocyanatopropyldimethylethoxysilane, 3-isocyanatopropyltrimethoxysilane, 3-isocyanatopropylmethyldimethoxysilane, 3-isocyanatopropyldimethylmethoxysilane; 4-aminobutyltriethoxysilane, 4-aminobutylmethyldiethoxysilane, 4-aminobutyldimethylethoxysilane, 4-aminobutyltrimethoxysilane, 4-aminobutylmethyldimethoxysilane, 4-aminobutyldimethylmethoxysilane, 4-amino-3,3-dimethylbutylmethyldimethoxysilane, dimethylbutyltrimethoxysilane, 1-amino-2-(dimethylethoxysilyl)propane, 3-(m-aminophenoxy)propyltrimethoxysilane, m-aminophenyltrimethoxysilane, m-aminophenyltriethoxysilane, 3-aminopropyltriethoxysilane, 3-aminopropylmethyldiethoxysilane, 3-aminopropyldimethyethoxysilane, 3-aminopropyltrimethoxysilane, 3-aminopropylmethyldimethoxysilane, 3-aminopropyldimethymethoxysilane, 3-aminopropylmethylbis(trimethylsiloxy)silane, 3-aminopropylpentamethyldisiloxane, 11-aminoundecyltriethoxysilane, and 11-aminoundecyltrimethoxysilane.

As mentioned above, the inventive reactive resins may be used in a variety of useful adhesive and sealing compositions and in particular anaerobic compositions. Typically, anaerobic adhesive compositions include a (meth)acrylate component and an anaerobic cure system, and often a catalyst. In addition to these conventional components, the inventive anaerobic compositions of the present invention include the reactive resins described herein incorporated in the amount of about 1.0% wt % to about 60 wt % of the total composition, desirably in the amount of about 1.0 WT % to about 30 wt % by weight of the total composition and more desirably in the amount of about 10.0 wt % to about 25 wt % of the total composition.

(Meth)acrylate monomers suitable for use as the (meth) acrylate component may be chosen from a wide variety of materials, such as those represented by $H_2C=C(G)CO_2R^1$, where G may be hydrogen, halogen or alkyl groups having from 1 to about 4 carbon atoms, and $R^1$ here may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

Other (meth)acrylate monomers may also be used, such as reaction products of the diglycidylether of bisphenol-A with methacrylic acid and a (meth)acrylate ester corresponding to structure as shown below:

Structure II

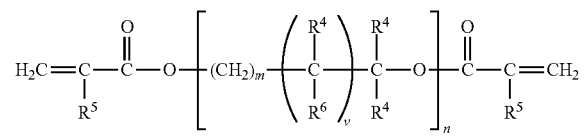

where $R^4$ may be selected from hydrogen, alkyl groups having from 1 to about 4 carbon atoms, hydroxyalkyl groups having from 1 to about 4 carbon atoms or

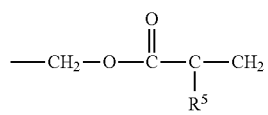

$R^5$ may be selected from hydrogen, halogen, and alkyl groups of from 1 to about 4 carbon atoms;

$R^6$ may be selected from hydrogen, hydroxy and

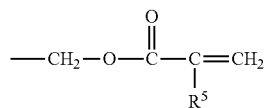

m is an integer equal to at least 1, e.g., from 1 to about 8 or higher, for instance, from 1 to about 4;

v is 0 or 1; and n is an integer equal to at least 1, e.g., 1 to about 20 or more.

Still other (meth)acrylate monomers that may be used herein include silicone (meth)acrylate moieties ("SiMA"), such as those taught by and claimed in U.S. Pat. No. 5,605,999, the disclosure of which is hereby expressly incorporated herein in its entirety by reference.

Additional (meth)acrylate monomers suitable for use herein include polyfunctional (meth)acrylate monomers, such as, but not limited to, di- or tri-functional (meth) acrylates like polyethylene glycol di(meth)acrylates, tetrahydrofuran (meth) acrylates and di(meth)acrylates, hydroxypropyl (meth)acrylate ("HPMA"), hexanediol di(meth)acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth) acrylate.

Of course, combinations of these (meth)acrylate monomers may also be used.

The (meth) acrylate component of the anaerobic compositions comprises generally from about 10 wt % to about 90 wt % of the total composition, preferably about 50 wt % to about 90 wt %, and typically about 55 wt % to about 85 wt %, based on the total weight of the composition.

In yet another aspect, additional components that have been included in traditional anaerobic curable compositions to alter the physical properties of either the curable compositions or the reaction products thereof may be included in the present compositions.

For instance, one or more of maleimide components, thermal resistance-conferring coreactants, diluent components reactive at elevated temperature conditions, mono- or poly-hydroxyalkanes, polymeric plasticizers, coloring agents, thickeners and chelators (see U.S. Pat. No. 6,391, 993, the disclosure of which is hereby expressly incorporated herein in its entirety by reference) may be included to modify the physical property and/or cure profile of the formulation and/or the strength or temperature resistance of the cured adhesive.

When used, the maleimide, coreactant, reactive diluent, plasticizer, mono- or poly-hydroxyalkanes, coloring agents, thickeners and/or chelators may be present in an amount generally in the range of about 0.001 wt % to about 30 wt %, desirably in the range of 0.001 wt % to about 10 wt % and typically in the range of 0.005 wt % to about 5 wt %, based on the total composition.

The inventive anaerobic adhesive compositions may also include other conventional components, such as free radical initiators, free radical accelerators, inhibitors of free radical generation, as well as metal catalysts, such as iron and copper. When UV or moisture cure compositions are desired, conventional UV and/or moisture cure systems may be employed.

The anaerobic cure system includes at least one cure initiator and at least one cure accelerator. The cure accelerator may be present as part of Structure I, added separately to the anaerobic composition or a combination of both.

The anaerobic adhesive compositions of the invention may contain a variety of initiators of free radical polymerization. A number of well-known initiators of free radical polymerization which are useful include, without limitation, hydroperoxides, such as cumene hydroperoxide ("CHP"), para-menthane hydroperoxide, t-butyl hydroperoxide ("TBH") and t-butyl perbenzoate. Other useful peroxides include benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, t-butyl cumyl peroxide, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

Examples of suitable cure accelerators are those listed, for example, in U.S. Pat. No. 6,835,762 (Klemarczyk), U.S. Pat. No. 6,897,277 (Klemarczyk) and U.S. Pat. No. 6,958,368 (Klemarczyk).

More specifically, the components of the anaerobic cure system may include CHP, tetramethylbutyl hydroperoxide and/or tert-amylhydroperoxide, tetrahydroquinoline and/or alkylated tetrahydroquinoline, each in an amount effective to trigger anaerobic cure when exposed to conditions substantially devoid of oxygen. Anaerobic cure for a period of time of 24 hours at room temperature ordinarily achieves at least about 80 percent of the ultimate strength of the cured composition.

The effective amount of the components of the anaerobic cure system should be in the range of 0.1 wt % to 5.0 wt % of the total composition. Each of the cure initiator and cure accelerator may be present in amounts of 0.1 wt % to about 5 wt % (e.g., about 0.1 wt % to about 3 wt %) of the total composition but their total weight together does not exceed 0.1 wt % to about 5 wt % of the total composition.

In yet another aspect, additional components that have been included in traditional anaerobic curable compositions to alter the physical properties of either the curable compositions or the reaction products thereof may be included in the present compositions and methods also.

When used, the maleimide, coreactant, reactive diluent, plasticizer, mono- or poly-hydroxyalkanes, coloring agents, thickeners, stabilizers and/or chelators may be present in an amount generally in the range of about 0.001 wt % to about 30 wt %, desirably in the range of 0.001 wt % to about 10 wt % and typically in the range of 0.005 wt % to about 5 wt %, based on the total composition.

EXAMPLES

Example 1

Preparation of a Curable (Meth)Acrylate-Functionalized Agrol 4.0 Based Polyurethane Resin with 3% Accelerating Diol Extended with IPDI (OH:NCO=1.0:1.72)

To a 2-L jacketed polymerization reactor equipped with a thermocouple, stirrer, condenser, and nitrogen inlet/outlet was added Agrol 4.0 (300.00 g, 0.199 moles), 1,2-propanediol, 3-(3,4-dihydro-1(2H)-quinolinyl) (17.38 g, 0.084 moles), dibutyltin dilaurate (0.58 g, 0.001 moles), 3-(3,5-ditert-butyl-4-hydroxyphenyl)propanoic acid [3-[3-(3,5-ditert-butyl-4-hydroxyphenyl)-1-oxopropoxy]-2,2-bis[[3-(3,5-ditert-butyl-4-hydroxyphenyl)-1-oxopropoxy]methyl]propyl] ester (0.07 g, 0.00006 moles), and 4-methoxyphenol (0.07 g, 0.0006 moles). The contents were heated to 60° C. and allowed to mix for 15 minutes. Isophorone diisocyanate (176.59 g, 0.794 moles) was added and allowed to react for +3 hours. A titration was then performed to determine the residual isocyanate content. 2-hydroxyethyl methacrylate (71.41 g, 0.548 moles, 1:1 residual NCO:OH equivalents) was then added and allowed to mix for +3 hours at 60° C. The methacrylated polyurethane accelerating resin was then removed from reaction vessel (535.2 g, 94.5% yield) to yield a clear, yellow, and viscous resin.

Example 2

Preparation of a Curable (Meth)Acrylate-Functionalized Pomoflex 61112 Based Polyurethane Resin with 3% Accelerating Diol Extended with IPDI (OH:NCO=1.0:2.0)

Pomoflex 61112 (115.24 g, 0.115 moles), 1,2-propanediol, 3-(3,4-dihydro-1(2H)-quinolinyl) (6.70 g, 0.032 moles), dibutyltin dilaurate (0.23 g, 0.0004 moles), 3-(3,5-ditert-butyl-4-hydroxyphenyl)propanoic acid [3-[3-(3,5-ditert-butyl-4-hydroxyphenyl)-1-oxopropoxy]-2,2-bis[[3-(3,5-ditert-butyl-4-hydroxyphenyl)-1-oxopropoxy]methyl]propyl] ester (0.23 g, 0.00019 moles), and 4-methoxyphenol (0.23 g, 0.0018 moles) is added to a 2-L jacketed polymerization reactor equipped with a thermocouple, stirrer, condenser, and nitrogen inlet/outlet. The contents were heated to 60° C. and allowed to mix for 15 minutes. Isophorone diisocyanate (68.08 g, 0.300 moles) is then added and allowed to react for +3 hours. A titration is then performed to determine the residual isocyanate content. 2-hydroxyethyl methacrylate (39.06 g, 0.300 moles, 1:1 residual NCO:OH equivalents) is then added and allowed to mix for +3 hours at 60° C. The methacrylated polyurethane accelerating resin was then removed from reaction vessel.

Example 3

Methacrylated Agrol 2.0/IPDI (OH:NCO=1.0:1.72) Polyurethane Resin

To a 2-L jacketed polymerization reactor equipped with a thermocouple, stirrer, condenser, and nitrogen inlet/outlet was added Agrol 2.0 (374.61 g, 0.1766 moles), dibutyltin dilaurate (0.24 g, 0.0004 moles), 3-(3,5-ditert-butyl-4-hydroxyphenyl)propanoic acid [3-[3-(3,5-ditert-butyl-4-hydroxyphenyl)-1-oxopropoxy]-2,2-bis[[3-(3,5-ditert-butyl-4-hydroxyphenyl)-1-oxopropoxy]methyl]propyl] ester (0.096 g, 0.00008 moles), 4-methoxyphenol (0.096 g, 0.0008 moles), and phosphoric acid (0.013 g, 0.00014 moles). The contents were heated to 60° C. and allowed to mix for 15 minutes. Isophorone diisocyanate (71.49 g, 0.321 moles) was added and allowed to react for +2 hours. A titration was then performed to determine the residual isocyanate content. 2-hydroxyethyl methacrylate (36.92 g, 0.284 moles, 1:1 residual NCO:OH equivalents) was then added and allowed to mix for 3 hours at 60° C. The methacrylated polyurethane resin was then removed from reaction vessel (451.6 g, 93.4% yield) to yield a clear, yellow, and viscous resin.

Example 4

Methacrylated Pomoflex 6156 and IPDI (OH:NCO=1.0:2.0) Polyurethane Resin

To a 2-L jacketed polymerization reactor equipped with a thermocouple, stirrer, condenser, and nitrogen inlet/outlet was added Pomoflex 6156 (150.00 g, 0.0749 moles), dibutyltin dilaurate (0.41 g, 0.0007 moles), 3-(3,5-ditert-butyl-4-hydroxyphenyl)propanoic acid [3-[3-(3,5-ditert-butyl-4-hydroxyphenyl)-1-oxopropoxy]-2,2-bis[[3-(3,5-ditert-butyl-4-hydroxyphenyl)-1-oxopropoxy]methyl]propyl]

ester (0.026 g, 0.00002 moles), 4-methoxyphenol (0.026 g, 0.0002 moles), and phosphoric acid (0.006 g, 0.00006 moles). The contents were heated to 60° C. and allowed to mix for 15 minutes. Isophorone diisocyanate (35.14 g, 0.1581 moles) was added and allowed to react for +2 hours. A titration was then performed to determine the residual isocyanate content. 2-hydroxyethylmethacrylate (18.10 g, 0.139 moles, 1:1 residual NCO:OH equivalents) was then added and allowed to mix for 3 hours at 60° C. The methacrylated polyurethane resin was then removed from reaction vessel (192.9 g, 94.7% yield) to yield a viscous resin.

Example 5

Methacrylated Agrol 2.0

To a 2-L jacketed polymerization reactor equipped with a thermocouple, stirrer, condenser, and nitrogen inlet/outlet was added Argol 2.0 (101.50 g, 0.0734 moles), dibutyltin dilaurate (0.08 g, 0.0001 moles), 3-(3,5-ditert-butyl-4-hydroxyphenyl)propanoic acid [3-[3-(3,5-ditert-butyl-4-hydroxyphenyl)-1-oxopropoxy]-2,2-bis[[3-(3,5-ditert-butyl-4-hydroxyphenyl)-1-oxopropoxy]methyl]propyl] ester (0.020 g, 0.00002 moles), 4-methoxyphenol (0.020 g, 0.0002 moles), and phosphoric acid (0.008 g, 0.00008 moles). The contents were heated to 60° C. and allowed to mix for 15 minutes. 2-ethylcyanatomethacrylate (40.49 g, 0.0261 moles) was then added and allowed to react for +4 hours. FT-IR was used to measure the consumption of isocyanate groups until reaction completion. The methacrylated resin was then removed from reaction vessel (156.6 g, 99.2% yield) to yield a viscous resin.

Example 6

Moisture Curable Agrol 3.6/IPDI (OH:NCO=1.72:1.0) Polyurethane Resin

To a 2-L jacketed polymerization reactor equipped with a thermocouple, stirrer, condenser, and nitrogen inlet/outlet was added Argol 3.6 (226.12 g, 0.1451 moles) and dibutyltin dilaurate (0.05 g, 0.008 mmoles). The contents are heated to 60° C. and allowed to mix for 15 minutes. Isophorone diisocyanate (28.94 g, 0.1302 moles) is added and allowed to react for +2 hours. 3-isocyanatopropyltrimethoxysilane (40.49 g, 0.0261 moles) is then added and allowed to react for +4 hours. FT-IR is used to measure the consumption of isocyanate groups until reaction completion. The methacrylated resin is removed from reaction vessel.

Example 7

Acrylated Agrol 3.6/IPDI (OH:NCO=1.72:1.0) Polyurethane Resin

To a 2-L jacketed polymerization reactor equipped with a thermocouple, stirrer, condenser, and nitrogen inlet/outlet is added Argol 3.6 (135.21 g, 0.0868 moles) and dibutyltin dilaurate (0.03 g, 0.005 mmoles). The contents are heated to 60° C. and allowed to mix for 15 minutes. Isophorone diisocyanate (17.31 g, 0.0779 moles) is added and allowed to react for +2 hours. 2-isocyanatoethyl acrylate (15.82 g, 0.112 moles) is then added and allowed to react for +4 hours. FT-IR was used to measure the consumption of isocyanate groups until reaction completion. The methacrylated resin is removed from reaction vessel.

Example 8

Moisture Curable Agrol 3.6

To a 2-L jacketed polymerization reactor equipped with a thermocouple, stirrer, condenser, and nitrogen inlet/outlet is added Argol 3.6 (153.87 g, 0.0987 moles) and dibutyltin dilaurate (0.03 g, 0.0048 mmoles). The contents are heated to 60° C. and allowed to mix for 15 minutes. 3-isocyanatopropyltrimethoxysilane (43.01 g, 0.305 moles) is then added and allowed to react for +4 hours. FT-IR is used to measure the consumption of isocyanate groups until reaction completion.

Example 9

Preparation of a Curable (Meth)Acrylate-Functionalized Agrol 4.0 Based Polyurethane Resin with 2.5% Accelerating Diol Extended with IPDI (OH:NCO=2.0:1.0)

To a 2-L jacketed polymerization reactor equipped with a thermocouple, stirrer, condenser, and nitrogen inlet/outlet was added Agrol 4.0 (108.21 g, 0.072 moles), 1,2-Propanediol, 3-(3,4-dihydro-1(2H)-quinolinyl)-(3.83 g, 0.018 moles), dibutyltin dilaurate (0.08 g, 0.012 mmoles), and 4-methoxyphenol (0.04 g, 0.031 mmoles). The contents were heated to 60° C. and allowed to mix for 15 minutes. Isophorone diisocyanate (17.19 g, 0.076 moles) was added and allowed to react for +3 hours. 2-ethylcyanatomethacrylate (23.52 g, 0.152 moles) was then added and allowed to mix for +3 hours at 60° C. The methacrylated polyurethane accelerating resin was then removed from reaction vessel (150.6 g, 98.4% yield) to yield a clear, yellow, and viscous resin.

Adhesive Testing

The following anaerobic compositions were prepared and tested on pins and collars. Compositions A and B were used as anaerobic retaining compounds on steel pins and collars and the results are shown in FIG. 1, after 15, 60 and 120 minutes respectively. As shown in the test results of FIG. 1, inventive Composition B, which contain a reactive resin having a sustainable plant oil component and an accelerator component built into the reactive resin polymer, showed improved shear strength at 60 minutes and 120 minutes respectively, as compared to inventive Composition A, which contained a sustainable plant oil source built into the reactive resin polymer, but did not have a built-in accelerator. i.e., composition A had a free accelerator added to its composition.

Compositions C through E were prepared as anaerobic threadlocking compositions. Each of these compositions contained a sustainable source as part of the reactive resin. Composition C had a free accelerator added to its composition. Compositions D and E contained an accelerator built into the reactive resin. The results after breakaway torque tests are shown in FIG. 2. FIG. 2 indicates that Compositions D and E, which have the accelerator built into the reactive resin, show comparable results as compared to Composition C, which contained a free accelerator in the composition.

TABLE I

| | Composition/Amount (wt %) | | | | |
|---|---|---|---|---|---|
| Component | A | B | C | D | E |
| Hydroxypropyl Methacrylate | 15 | 15 | | | |
| Polyethylene Glycol (PEG) Dimethacrylate | | | 70 | 70 | 60 |

TABLE I-continued

| Component | Composition/Amount (wt %) | | | | |
|---|---|---|---|---|---|
| | A | B | C | D | E |
| PEG-200 Monooleate Plasticizer | | | 19.9 | 0 | 0 |
| Proprietary Rigid Polyurethane Resin | 50 | 41.8 | 0 | 0 | 0 |
| Proprietary Flexible Polyurethane Resin | 23.8 | 0 | 0 | 0 | 0 |
| Acrylic Acid | 6 | 6 | 0 | 0 | 0 |
| Stabilizers | 0.2 | 0.2 | 0.8 | 0.8 | 0.8 |
| Chelators | 1 | 0.1 | 0.15 | 0.15 | 0.15 |
| Water | 0 | 0.9 | 1.35 | 1.35 | 1.35 |
| Saccharin | 1 | 1 | 3 | 3 | 3 |
| THQ-diol[1] | 1 | 0 | 0.8 | 0 | 0 |
| (Meth) acrylate Functionalized Polyurethane[2] | 0 | 33 | 0 | 22.7 | 32.7 |
| Cumene Hydroperoxide | 2 | 2 | 2 | 2 | 2 |
| Fumed Silica | 0 | 0 | 2 | 0 | 0 |

[1] Free Accelerator
[2] Methacrylate functionalized polyurethane made from Agrol 4.0 hydroxylated soybean oil, Isophorone Diisocyante, 3% THQ-diol accelerator and 2-hydroxyethyl methacrylate, as per Example 1.

The invention claimed is:

1. A reactive resin having the structure:

B-(Q)$_{2-10}$ wherein:
a) B is selected from an oleaginous polymer unit derived from a plant or animal source;
b) Q is [(U-L-U-A)$_y$-U-L-]$_x$-U-F;
c) U is selected from the group consisting of a urethane linkage, a urea linkage and a thiourea linkage and may be the same or different in each occurrence;
d) L is a residue unit of a diisocyanate, said residue unit having a molar mass of from about 60 to about 500 g/mol;
e) A is an accelerator residue unit;
f) F is a (meth)acrylate-containing group or an alkoxy silane group;
g) x is 1-100; and
h) y is 1-10; and
wherein the oleaginous polymer unit contains one or more functional groups selected from OH, NH$_2$, and SH, and wherein an equivalents ratio of the functional groups of the oleaginous polymer unit to NCO groups in the diisocyanate is about 0.1 to about 10.0.

2. The reactive resin of claim 1, wherein the plant source B is selected from the group consisting of soybean oil, almond oil coconut oil, corn oil, cottonseed oil, flaxseed oil, linseed oil, olive oil, palm oil, peanut oil, safflower oil, sesame oil, sunflower oil, walnut oil and combinations thereof.

3. The reactive resin of claim 1, wherein the animal source B is a fatty acid comprising tallow.

4. The reactive resin of claim 1, wherein the plant source has a functionality of about 1.0 to about 7.0.

5. The reactive resin of claim 1, wherein L is an aliphatic or aromatic unit hydrocarbon unit, which may be interrupted by one or more 0, N or S.

6. The reactive resin of claim 1, wherein (meth)acrylate-containing group F is derived from the group consisting of 2-isocyanatoethyl methacrylate, 2-isocyanatoethyl acrylate, 3-isopropenyl-α,α-dimethylbenzyl isocyanate, 2-hydroxyethyl methacrylate, 2-hydroxyethyl acrylate, isomers of hydroxybutyl acrylate, isomers of hydroxybutyl methacrylate, isomers of hydroxypropyl acrylate, poly(propylene glycol) (meth)acrylate, poly(ethylene glycol) (meth)acrylate, and 2-hydroxy-3-phenoxypropyl acrylate.

7. The reactive resin of claim 1, wherein alkoxysilane containing group F is derived from the group consisting of 3-isocyanatopropyltriethoxysilane, 3-isocyanatopropylmethyldiethoxysilane, 3-isocyanatopropyldimethylethoxysilane, 3-isocyanatopropyltrimethoxysilane, 3-isocyanatopropylmethyldimethoxysilane, 3-isocyanatopropyldimethylmethoxysilane, 4-aminobutyltriethoxysilane, 4-aminobutylmethyldiethoxysilane, 4-aminobutyldimethylethoxysilane, 4-aminobutyltrimethoxysilane, 4-aminobutylmethyldimethoxysilane, 4-aminobutyldimethylmethoxysilane, 4-amino-3,3-dimethylbutylmethyldimethoxysilane, dimethylbutyltrimethoxysilane, 1-amino-2-(dimethylethoxysilyl)propane, 3-(m-aminophenoxy)propyltrimethoxysilane, m-aminophenyltrimethoxysilane, m-aminophenyltriethoxysilane, 3-aminopropyltriethoxysilane, 3-aminopropylmethyldiethoxysilane, 3-aminopropyldimethyethoxysilane, 3-aminopropyltrimethoxysilane, 3-aminopropylmethyldimethoxysilane, 3-aminopropyldimethymethoxysilane, 3-aminopropylmethylbis(trimethylsiloxy)silane, 3-aminopropylpentamethyldisiloxane, 11-aminoundecyltriethoxysilane, and 11-aminoundecyltrimethoxysilane.

8. The reactive resin of claim 1, wherein the accelerator unit A prior to reaction with L contained at least one 0, N or S which reacted to form U.

9. The reactive resin of claim 1, wherein said reactive resin is formed from the reaction of
a) an oleaginous polymer derived from a plant or animal source which contains one or more pendent functional groups selected from OH, NH$_2$ and SH groups;
b) a diisocyanate in an amount sufficient to leave remaining pendent active NCO groups connected through a linkage to the oleaginous polymer, said linkage selected from the group consisting of a urethane linkage, a urea linkage and a thiourea linkage, wherein an equivalents ratio of the functional groups of the oleaginous polymer unit to NCO groups in the diisocyanate is about 0.1 to about 10.0;
c) an accelerator having one or more reactive groups which react in the presence of NCO;
d) a (meth)acrylate-containing or alkoxysilane-containing component which further contains a functional group which reacts with at least one of an NCO group, an OH group, an NH$_2$ group and an SH group.

10. The reactive resin of claim 1, wherein said reactive resin is formed from the reaction of:
a) an oleaginous polymer derived from a plant or animal source which contains one or more pendent functional groups selected from the group consisting of OH, NH$_2$, and SH groups;
b) an accelerator having one or more reactive groups which react in the presence of NCO; and
c) a (meth)acrylate-containing or alkoxysilane-containing isocyanate;
wherein an equivalents ratio of OH:NCO groups in the accelerator and isocyanate is about 0.1 to about 3.0.

11. A The reactive resin of claim 1, wherein said reactive resin comprises the reaction product of:
a) a plant oil or animal fat, said plant oil or animal fat functionalized with one or more of an hydroxyl group, an NH$_2$ group and an SH group, said plant or animal oil further containing a reactive isocyanato group, wherein an equivalents ratio of the functional groups of the plant oil or animal fat to NCO groups in the isocyanato group is about 0.1 to about 10.0;
b) an accelerator having one or more reactive groups which react in the presence of NCO; and c) a (meth)acrylate containing at least one of an OH group and a Ha NCO group, or an isocyanate-terminated alkoxysilane.

12. The reactive resin of claim 1, wherein the isocyanate residue unit may be a saturated or unsaturated hydrocarbon and which may be substituted or unsubstituted, and may be interrupted with one or more O, S or N atoms.

13. The reactive resin of claim 10, wherein said oleaginous polymer derived from a plant or animal source further contains one or more NCO pendent functional groups.

14. An anaerobic composition comprising:
    a) at least one (meth)acrylate component;
    b) an anaerobic cure system; and
    c) a reactive resin represented by the structure $$B\text{-}(Q)_{2\text{-}10} \qquad \text{Structure I}$$

wherein:
i) B is selected from an oleaginous polymer unit derived from a plant or animal source;
ii) Q is $[(U\text{-}L\text{-}U\text{-}A)_y\text{-}U\text{-}L\text{-}]_x\text{-}U\text{-}F$
iii) U is selected from the group consisting of a urethane linkage, a urea linkage and a thiourea linkage and may be the same or different in each occurrence;
iv) L is a residue unit of a diisocyanate, said residue unit having a molar mass of from about 60 to about 500 g/mol;
v) A is an accelerator residue unit;
vi) F is a (meth)acrylate-containing group or an alkoxy silane group;
vii) x is 1-100; and
viii) y is 1-10
wherein the oleaginous polymer unit contains one or more functional groups selected from OH, $NH_2$ and SH, and
wherein an equivalents ratio of the functional groups of the oleaginous polymer unit to NCO groups in the diisocyanate is about 0.1 to about 10.0.

15. The composition of claim 14, further comprising a material selected from the group consisting of stabilizers, accelerators, initiators, catalysts, thickeners, coloring agents, chelators, diluents and combinations thereof.

16. The reactive resin of claim 14, wherein the isocyanate residue unit may be a saturated or unsaturated hydrocarbon which may be substituted or unsubstituted, and may be interrupted with one or more O, S or N atoms.

17. A method of bonding a surface comprising the steps of:
    1) providing an adhesive composition comprising;
        a) at least one (meth)acrylate component;
        b) a cure system; and
        c) a reactive resin represented by the structure $$B\text{-}(Q)_{2\text{-}10} \qquad \text{Structure I}$$

wherein:
i) B is selected from an oleaginous polymer unit derived from a plant or animal source;
ii) Q is $([(U\text{-}L\text{-}U\text{-}A)y\text{-}U\text{-}L\text{-}]x\text{-}U\text{-}F)$
iii) U is selected from the group consisting of a urethane linkage, a urea linkage and a thiourea linkage and may be the same or different in each occurrence;
iv) L is a residue unit of a diisocyanate, said residue unit having a molar mass of from about 60 to about 500 g/mol;
vi) A is an accelerator residue unit;
vii) F is a (meth)acrylate-containing group or an alkoxy silane group;
viii) x is 1-100; and
ix) y is 1-10
wherein the oleaginous polymer unit contains one or more functional groups selected from OH, $NH_2$ and SH, and
wherein an equivalents ratio of the functional groups of the oleaginous polymer unit to NCO groups in the diisocyanate is about 0.1 to about 10.0;
    2) applying composition to a surface of a substrate;
    3) mating said substrate with another substrate; and
    4) permitting said composition to cure.

18. The method of claim 17, wherein the substrate is constructed from a material selected from zinc, steel, stainless steel, cadmium and combinations thereof.

19. The method of claim 17, wherein the substrate is a nut or bolt, or a collar and a pin.

* * * * *

UNITED STATES PATENT AND TRADEMARK OFFICE
CERTIFICATE OF CORRECTION

PATENT NO. : 10,822,444 B2  
APPLICATION NO. : 15/953632  
DATED : November 3, 2020  
INVENTOR(S) : Andrew D. Messana et al.

It is certified that error appears in the above-identified patent and that said Letters Patent is hereby corrected as shown below:

In the Specification

Column 1, Line 31 change "one 0=0 group" to --one C=C group--.

Column 4, Line 1 change "x is 0400" to --x is 0-100--.

Column 8, Line 17 change "two isocyante isocyanate groups" to --two isocyanate groups--.

In the Claims

Column 21, Line 2 Claim 11 change "a Ha NCO group" to --a NCO group--.

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*